United States Patent Office 2,979,108
Patented Apr. 11, 1961

2,979,108

SOLUTION AND METHOD FOR TREATING MICA PRODUCTS AND ARTICLES PRODUCED THEREFROM

John S. Thompson, Detroit, Mich., assignor to Oxalloy Company, Detroit, Mich., a corporation of Michigan No Drawing. Filed Sept. 24, 1956, Ser. No. 611,767

11 Claims. (Cl. 154—2.6)

This invention relates generally to improvements in the art of treating particles of mica and more particularly to an improved solution and method for treating mica particles and to articles produced therefrom.

Mica in the form of thin splittings has been used extensively for a good many years in electrical applications. For the most part, mica is split by hand which adds considerably to the cost thereof and in addition more waste is unavoidably produced than usable material. Where the area involved is extensive either single large splittings which are expensive are employed or smaller splittings are joined usually by a glass type bond in contiguous relation to make a sheet. Although very thin splittings possess considerable flexibility they present definite limitations in the forming of other than flat laminates or plates.

Recently it has been possible to manufacture mica in sheet or paper form from finely ground mica, for example see U.S. Patents 2,405,576, issued August 13, 1946, and 2,549,880, issued April 21, 1951. The method of processing in the first-mentioned of these patents makes use of the natural cohesion of the mica particles so that use of a binder is unnecessary. Use is made of small splittings formerly considered waste. The mica sheet produced however has very poor wet strength; some of the sheets of this general type even disintegrate when contacted with water and return to slurry form. The second of the mentioned patents suggests employing materials which, for use in admixing with mica pulp, react to yield fusible glasses. The glass type bond formed from such materials functions principally in a physical rather than a chemical manner to effect adherence of the mica particles. In employing materials of this type, the bond usually is produced under pressure and heat sufficient to form the glass and cause it to flow. The forming temperatures usually range from about 1000° to 1200° F., and the product thus produced possesses an inherent limitation in that it cannot be generally used for higher temperature applications than the forming temperature without causing the binder to reflow resulting in the product's losing its shape.

It has now been found that aqueous solutions of inorganic binders of the glass forming type, such as have been used in the past for joining splittings and as an additive for incorporation in mica pulp, when used in a different manner than heretofore, such as for impregnating particulate mica in sheet form, present serious problems as they cause the mica sheet to weaken to the point where it is very difficult if not impossible to handle. Obviously, a treating method in which good wet strength is destroyed is of very little value from a practical standpoint since the sheets or paper must be handled considerably while saturated during their processing. Since in many cases saturation of the mica sheet or paper must be complete, i.e., the sheet must be wet throughout its entire cross-section and a thickness as low as fifteen ten-thousandths of an inch may have to be handled, it can be readily appreciated that adequate wet strength is of prime importance.

Accordingly, the principal objects of the present invention are the provision of an improved aqueous acidic solution for use in treating mica particles and particulate mica in sheet form, an improved method of employing such solutions and articles produced therefrom whereby the wet strength of particulate mica sheets is exceedingly enhanced. The above and related objects will become apparent in the course of the following description considered in its entirety.

Briefly, and in a broad aspect, the invention is embodied in an aqueous acidic solution comprising $PO_4$ and aluminum in certain well-defined proportions which preferably include other materials as hereinafter set forth, a method of treating mica particles therewith and articles of particulate mica in sheet form produced therefrom. All of the known types of mica which can be put up in particle form may be treated by the solution and method of the present invention, such as muscovite mica and phlogopite mica and the more recently developed synthetic micas. As will appear, the $PO_4$ is usually introduced into the solution of the invention by way of an aqueous solution of phosphoric acid and the aluminum by way of aluminum oxide. For sake of brevity and convenience in description, such terms as acid phosphate of aluminum or aluminum phosphate or the phosphate will be employed, and it is intended where the context so admits to mean the combination of $PO_4$ and aluminum in an aqueous acidic solution within the proportions as will be hereinafter set forth, irrespective of the particular compounds used to introduce the aluminum and $PO_4$ radicals.

The mechanism of bonding and chemical interchanges which occur in treating mica sheet with the solutions of the invention are not completely understood. Although the aluminum phosphate acts as a good adhesive when first applied, the bonding apparently occurs in a physical manner and, upon causing the phosphate and mica to react chemically, as described later, the mechanical adhesion is replaced with a chemical type bond formed by products of reaction in which the phosphate undergoes a radical change in its characteristics. From what appears, the most satisfactory chemical bond is attained when the formation of the physical bond is first promoted.

Considerable variation in the composition and concentration of the subject solution is permissible, as will be set forth, depending upon the various objectives at hand. A solution containing on the one hand relatively large amount of water and on the other a relatively small amount of water may be used, in good saturation obtained. In general, as the dilution increases, the acidity or ratio of $PO_4$ to metal must decrease if the characteristic improvement in wet strength is to be realized. The viscosity of the solution does not seem to be a controlling factor since different solutions having about the same viscosity but differing in solids content will penetrate at different rates. There is considerable porosity in the mica sheet, it being usual that voids may amount to approximately 50% by volume of the same. Evidence indicates that almost immediately on contact between the mica and the aluminum phosphate a reaction takes place which, although not detectable by conventional means, has a significant effect on the ease of penetration of the solution and which becomes more pronounced as the acidity or ratio of $PO_4$ to metal decreases.

The particle size of the mica has also an effect on the initial reaction which becomes more pronounced as the particle size of the mica in the paper decreases. It is probably related to an increase in surface area. If two papers of the same thickness but with different size particles are treated with the same solution and oven dried for the same length of time, the one containing the smaller particles will lose water more rapidly and develop the greater amount of tensile strength. This characteristic has been utilized with certain solutions by suspending in them a quantity of powdered mica where the particle size is much smaller than used in making paper. In this case, since the particles of mica are still too large to enter the paper to any appreciable extent along with the solution and dissolved solids, the change brought about by the incorporation of finely divided mica occurs pretty much at the surface. The increase in tensile strength in such cases begins to show up almost immediately after the solution is applied and even before baking or heat treating. It is not uncommon to obtain an increase of five or six hundred percent over that obtainable on the untreated paper. This procedure is especially useful in applications where a low percentage of solids must be deposited within the paper, necessitating the use of dilute solutions which might otherwise have a detrimental effect on the wet strength. In addition, as dilution increases, less aluminum phosphate is retained at the surface, causing a decrease in bonding ability. The added mica either by reaction or by what might be considered a selective retention of the phosphate greatly extends the range of dilution with respect to both tensile strength and strength of bond.

Powdered mica of about three thousand mesh has been used with considerable success. However, certain precautions must be observed. If too much is added an objectionable thickening occurs, making it difficult to control the amount applied to the paper. This is especially true of solutions containing a relatively high amount of dissolved metal, or where the acidity is relatively low. Why thickening occurs is not known. It may be associated with some physical change such as swelling of the mica particles but no evidence has been found to support it. On the other hand, pH measurements taken both on the complete mixture and the separated liquid show no change from the original over long periods. As the percent of dissolved solids increases the value of the added mica becomes less pronounced and if high enough there is apparently little object in using it.

If the cross-section of the laminate or tube containing several layers of paper is examined with sufficient magnification, it will be found that in the absence of added mica in the solutions of the invention the layers blend so completely that it is difficult to identify the separate sheets. Where mica is incorporated in the solutions, it forms a distinct layer. If the two types of products are subjected to high temperature tests, the one treated by solutions without the added mica will usually be somewhat stronger.

While the invention will be described hereinafter in connection with the treatment of particulate mica in sheet form, it should be understood that the solutions of the invention can be employed in treating mica particles per se in the various stages of the process of forming them into sheet or paper form.

Varying amounts of different solutions may be applied to the mica paper or sheet and in all cases a certain amount of water must be removed if the subsequent forming and curing operations are to be successful. However, in view of the negligible amount of reaction with the paper with ordinary oven temperatures up to at least 300° F., the sheet will remain in a thermoplastic condition and can be formed into irregular shapes as well as flat laminates. A sheet may stiffen on being removed from the oven but will regain its flexibility on being reheated.

Mica paper in general weighs approximately one ounce per square yard for each .001 inch in thickness. In coating the paper it can be seen that a small variation in the uniformity of the layer deposited could be very significant percentagewise. It is very important that the layer be as uniform as possible, so that when baked the amount of water retained will be reasonably constant throughout the sheet. Within a considerable range in amount of solution applied, the percent of water removed under the same time and temperature of treatment will be the same, but the actual amount will vary in proportion to the amount applied. Therefore, it would be possible with poor coating equipment to retain twice as much water in one area as in another. Such a condition will favor the formation of blisters in areas of high water content on subsequent curing, the condition being more pronounced as the molding pressure increases.

After coating, the sheets will show a loss of weight without baking, if exposed to a dry atmosphere. Therefore, the partial drying step can occur at room temperature with longer time periods involved. On the other hand, the treated sheets will increase in weight even after baking if exposed to high humidity. Therefore, in order to accurately calculate the amount of water involved, in preliminary tests to determine operating standard, the paper should be weighed promptly after coating, and after baking kept in a container or in the form of a roll if continuous strips are processed. The treated paper will remain active and in suitable condition for further processing into flat and tubular laminates indefinitely. If the moisture content should accidentally become too low on storage, it can easily be replaced by a brief steaming treatment.

Immediately after being coated the paper becomes rather translucent, the change being more apparent with solutions containing no added mica. A single coat on one side of the sheet may penetrate as much as seventy or eighty percent of the thickness of the paper but it may show a faint mottled effect depending on slight differences in density of the paper from place to place. When the opposite side is coated translucency will increase whether or not the first coating has been baked. It has been observed that even though as high as eighty percent of the water has been removed by baking the translucency will further increase if the paper is allowed to stand at room temperature for a day or two. This is apparently due to a gradual migration of the solids into areas of lowest saturation or greatest density and can occur even during further loss in weight. Wherever practical, there should be some delay, therefore, between the initial preparation of the sheets and their further processing.

Solutions may be applied by spraying provided care is taken to control the amount used and to produce uniformity. The preferred method is by a roller coating procedure which provides much better control over both factors. A procedure which has been found to be very good makes use of a first roll which picks up the solution from a reservoir and deposits it on a second roll disposed above the first and which is adjustable so as to regulate both the thickness of the film and its uniformity across the length of the roll. The paper is passed over the top of the roll under tension and preferably with some angle formed at the point of contact in order to somewhat increase the area of contact between the paper and the roll. The roll should rotate in the direction opposite that of the paper travel and rapidly enough to exert a mild wiping action. If both the paper and the roll travel in the same direction and at the same surface speed the depth of the paper which has been saturated is apt to separate from the dry section and follow the roll.

Since baking required resolves itself into a question of equipment and space, moisture should be removed as rapidly as practical. Preferably one side is coated and baked before the other side is similarly treated. It is possible in some instances to coat each side of the paper in succession without baking between applications of the coating, but in this case the amount of solution applied should be on the low side and a temperature selected which will not cause blistering. When the amount of solution is what might be considered normal or above, one side only should be coated then baked. It will usually be found that the amount absorbed by the first application will be greater than that with the second. More water is therefore applied and so more must be removed. With only the one coat present the moisture can be removed both from the coated side and through the uncoated layer opposite.

It is practical in some cases, especially where the amount of solution used is low or where an article is not pressed to too high a density, to omit the second baking operation especially if the time of making on the first coat is extended to remove an extra amount of water.

In any case, whether laminates, tubes or some other articles are to be made the best bond between the different layers is obtained by rolling or by stacking the paper so that the side subjected to the longest drying time contacts the one from which the lowest amount of water was removed.

The coating and fabrication of a product with paper which has been coated on only one side is not recommended unless strength of bond is a secondary consideration.

As indicated above, solutions may be compounded so that either rapid saturation or a high adhesive value becomes the main characteristic. In certain applications where it is impossible to apply very much pressure for laminating use may be made of both solutions by first obtaining good saturation and using a different composition on the other side in which case the rate of penetration may be low but the bonding ability stepped up.

The compositions of the present invention are in the form of aqueous acidic solutions which comprise as essential ingredients $PO_4$ and aluminum to which may be added magnesium and mica. The $PO_4$ is preferably introduced through the use of aqueous phosphoric acid. The aluminum is preferably introduced through the use of aluminum oxide, it being understood that the aluminum may be introduced in other forms. For example, the aluminum may be introduced through the use of aluminum hydroxide or the metal itself. Similarly the magnesium is preferably introduced through the use of magnesium oxide but may be introduced through the use of other soluble compounds of magnesium, such as the hydroxide, the carbonate or the metal itself. The proportions of the essential ingredients based on a given weight of $PO_4$ should be maintained within certain well-defined limits for satisfactory results. Selecting 730 parts by weight of $PO_4$ as the given amount, the weight of aluminum should be maintained between about 34 and about 80 parts by weight, the weight of magnesium between 0 and about 34 parts by weight, the amount of water between about 300 and about 1550 parts by weight, and the amount of mica between 0 and about 770 parts by weight. Generally as the dilution increases toward the maximum dilution of 1550 parts by weight of water, for any fixed ratio of metal to $PO_4$, it is preferred that mica be present in relatively greater quantities within the proportions set forth. As the dilution increases in the absence of a corresponding increase of mica the metal ion content with respect to $PO_4$ should be increased relatively and examples of satisfactory ratios of metal to $PO_4$ and amounts of mica are set forth in Examples I and II below. Where no mica or magnesium is present and the aqueous acidic solution is an aluminum phosphate solution, it should contain 3% to 4½% aluminum. Below 3% aluminum, the adhesiveness is unsatisfactory and above 4½% aluminum the solution is not stable and has a limited shelf life. When the magnesium is introduced in its preferred form as magnesium oxide, the amount thereof should be maintained between 0 and about 55 parts by weight of magnesium oxide while maintaining the same proportions of the other ingredients as set forth above. As mentioned, the aluminum is preferably introduced in the form of aluminum oxide. A particularly suitable aluminum oxide is a trihydrate containing approximately 34% by weight of aluminum. A specific example of an oxide of this type and the one which was used in the examples set forth below is a product of the Aluminum Company of America identified as C–730. When aluminum oxide containing about 34% by weight of aluminum is employed in the solutions the amount thereof should be maintained between about 100 and about 235 parts by weight while maintaining the proportions of the other ingredients within the ranges set forth above.

The following are examples of satisfactory solutions of the present invention:

Example I

| | Parts by weight |
|---|---|
| 75% $H_3PO_4$ | 1000 |
| $Al_2O_3 \cdot 3H_2O$ | 235 |
| MgO | 55 |
| $H_2O$ | 867 |
| pH | 2.50 to 2.65 |

The above composition possesses excellent adhesive properties together with slow saturation ability. The above solution gives an excellent bond when used alone and with the application of practically no pressure. The addition of a small amount of powdered mica produces some advantages. If greater than relatively small amounts of mica are employed in the solution it should be added just before applying the same as otherwise thickening of the solution will occur. In the above solution the use of magnesium makes possible the attaining of a higher pH than with aluminum alone with a given quantity of acid because of its greater solubility.

Example II

| | Parts by weight |
|---|---|
| 75% $H_3PO_4$ | 1000 |
| $Al_2O_3 \cdot 3H_2O$ | 200 |
| MgO | 25 |
| $H_2O$ | 700 |
| Powdered mica | 385 |
| pH | 1.40 |

The above composition produces the combination of a good bond and good saturation. The solution of this example is illustrative of the general type of solution within the present invention and in which the strength of the bond attained is greatly increased by the presence of the added mica. Likewise several-fold increase in the tensile strength develops on drying with this solution. If magnesium were omitted in the above solution a lowering of the pH and an increased rate of penetration would result at the risk of some decrease in wet strength. In the higher range of concentrations within the ranges previously set forth, when the proportions of the ingredients of the above solution are altered in this direction, the shelf life of the modified solution is limited because the phosphates tend to crystallize. As the amount of dilution increases the addition of powdered mica becomes increasingly necessary to good handling strength of the treated paper, and the amount of mica employed can be stepped up to as much as 3 to 4 parts for every 10 parts by weight of the clear solution.

The composition set forth in the example below illustrates a further modification wherein the concentration of the dissolved solids is high, the pH is too low to be measured with accuracy and wherein both good saturation and good bonding are attained without requiring the addition of powdered mica.

Example III

| | Parts by weight |
|---|---|
| 75% $H_3PO_4$ | 1000 |
| $Al_2O_3 \cdot 3H_2O$ | 133 |

The proportions of the ingredients of the above aluminum phosphate solution set forth produce a concentration of about 4% by weight of aluminum. A quantity of the above solution and a separate quantity of 75% phosphoric acid with the same area exposed in each case were allowed to stand at room temperature for 48 hours. The above solution had lost 45% of its water content while the acid solution had lost only 17.5%. This phenomenon is clear evidence of the change brought about by the presence of aluminum and the ease with which such compositions liberate water is useful in connection with the subsequent treatment to which the impregnated sheets are subjected for removal of water.

*Example IV*

| | Parts by weight |
|---|---|
| 85% $H_3PO_4$ | 1000 |
| $Al_2O_3 \cdot 3H_2O$ | 152 |

The composition of the above example has been employed with less success in relation to the solutions of the prior examples. The penetrating ability thereof is reduced due to its greater viscosity. The following composition was employed with satisfactory results although made up from more concentrated acid and a reasonably good bond was consistently obtained, notwithstanding the low amount of aluminum present.

*Example V*

| | Parts by weight |
|---|---|
| 85% $H_3PO_4$ | 1000 |
| $Al_2O_3$ | 40 |
| ZnO | 25 |

In production where any of the solutions described are continuously exposed to the atmosphere they slowly lose water and an occasional check should be made on the specific gravity and the loss corrected in order to maintain a given concentration.

In the following remarks whenever the percentage of the solutions of the invention is mentioned it indicates the parts by weight applied to one hundred parts by weight of the mica paper, e.g., a consumption of 20% refers to that many parts by weight of solution applied to one hundred parts by weight of the mica paper.

The concentration of solution applied apparently has an influence on the rate at which reaction will take place with the mica when the temperature is raised to a point where such reaction is possible. Whether or not that is the only factor involved the results of a great many tests show conclusively that several times as many phosphate solids can be applied to the paper by a dilute solution such as that of Example II than can be applied from a concentrated solution such as that of Example III. Amounts of the solution of Example II amounting to as high as 150% of the paper weight have been used with good results but around 35% is the upper limit with the solution of Example III with 30% to 35% being preferred for paper containing exceptionally fine particles and about 20% being optimum for paper where the particles are somewhat larger. Excessive amounts of the solution of Example III cause random blisters when a laminate or tube is heated even though the water content may be unusually low.

The production of both flat and tubular laminates is a feature of the invention; and since different considerations obtain in the fabrication of each they will be discussed separately.

TUBES

Tubes are usually formed by winding on a mandrel where the width of the paper strip is the same length as the tube and the length of the paper sufficient to form the required wall thickness, or by using fairly narrow strips of paper which are wound back and forth in spiral form. The solutions of Examples I, II and III are especially well adapted for use in either method. The solution of Example I should preferably be used on only one side of the paper and where the winding pressure is generally of a low order. The paper is started on the mandrel in any convenient way, but in any case there must be provision for easy removal after rolling is completed. Direct contact between the solution and the mandrel may be avoided by starting with an end which has been left uncoated for a distance equal to a little more than the mandrel circumference, or contact can be prevented by first coating the mandrel with a thin film of petroleum jelly.

Tubes made with the solutions of the invention possess a surprising amount of green strength and may be pushed from the mandrel immediately after being formed. This is of great advantage because in the subsequent drying operations water can be expelled through both surfaces. Moreover, there is no necessity for a large number of mandrels as is the case with numerous low temperature bonding agents where the tubes must be supported during at least a part of the curing cycle.

With special reference to using a width of paper corresponding to the tube length, there should be a substantial amount of pressure applied during the entire operation. After the required length of paper has been wound the mandrel should be given 20 to 30 additional turns. Both factors have a pronounced and favorable effect on the ultimate density. An applied pressure of around 40 pounds per lineal foot of tube is satisfactory. Higher pressures can be used if the paper is not disrupted. Where desired, a higher density may be obtained by hot pressing the tube either on the original or on a temporary mandrel.

The above has reference to the making of tubes which are round or oval in shape. In the making of square or rectangular tubes, the paper is rolled up in the same manner, but unless unusually high rolling pressures are used it will be found necessary to hot press them for a short time in order to maintain precision at the corners and a uniform cross-section in the walls. A temperature of 325 to 350° F. at 400 pounds per square inch applied for 30 to 60 minutes depending on wall thickness is satisfactory.

When the paper has been suitably coated and baked, both the strength and flexibility are such that tubes with an inside diameter as low as .078 inch can be made with no difficulty. There appears to be no special limit as to how large a diameter or wall thickness a tube may have. Walls up to ½ inch thick have been processed through to the final steps with no trouble.

Ordinarily the density of a rolled tube will be less than that of a hot pressed laminate prepared with the same materials so a somewhat higher water content may be retained in the sheets prior to rolling without disrupting the layers and subsequent heating operations.

An outstanding characteristic of tubes made with the solutions of Examples II and III particularly is their unusual dimensional stability. With many saturating agents of the low temperature variety that have been tried, it is necessary to compensate in the mandrel size for either shrinkage or expansion which takes place upon curing. According to the procedure described above no such compensation is necessary. Many tubes have been measured both inside and outside after being removed from the mandrel and measured again after they have been through the final heat treat at 1000° F. and seldom has the change been found to amount to more than about 0.002 inch even over a considerable range of sizes. The same characteristic dimensional stability is found in the tube length.

The following is an outline of the steps employed in making a round tube with 0.002 inch thick paper with the solution of Example II.

*Example VI*

(1) One side of the mica paper was coated with 20 to 25% of the solution of Example II.

(2) The sheet was baked for 1½ to 2 minutes at 200° F.

(3) The other side of the mica paper was coated with 20 to 25% of the same solution.

(4) The thus treated sheet was rolled on a mandrel and about 40 pounds for each foot of tube was applied. The mandrel was rotated 20 to 30 times until the paper was used up.

(5) The wound tube was removed from the mandrel.

(6) The tube was then baked overnight at 200° F.

(7) The tube was then heat treated. Heat was applied to the tube commencing with room temperature and thereafter increased in a manner such that 3 or 4 hours were required to reach 500 to 600° F. The rate of heating was then increased so that 1000° F. was reached in 20 to 30 minutes. The tube was maintained at 1000° F. for 30 to 60 minutes, which time will vary with the wall thickness with other factors constant. The temperature was allowed to drop to 600 to 700° F. before the tube was removed from the source of heat.

The presence of some water is necessary while rolling in order to obtain a good bond. It is advisable to remove at least a portion of the water at a low temperature before subsequent higher temperature heat treating in order to avoid formation of blisters and hence the inclusion of the step of baking the tube overnight. It should be noted that the second coat of solution was not baked.

In one industrial application, tubes made according to the procedure described above were inserted in a metal tube and heated to 1980° F. within about 4 minutes. Thereafter, they were compressed to the point where about 20% reduction of the cross-sectional area occurred without any evidence of spalling or cracking.

The following is an outline of the steps employed in making a round tube with 0.003 inch thick paper with the solution of Example III.

*Example VII*

(1) One side of the mica paper was coated with 15 to 20% of the solution of Example III.

(2) The sheet was baked for 5 minutes at 250° F.

(3) Approximately 15% of the same solution was applied to the other side of the sheet.

(4) The sheet was again baked for 5 minutes at 250° F. Steps 4 through 7 of the procedure set forth in Example VI were then carried out.

The 0.003″ paper which was employed in Example VII was of a type in which the mica particles were unusually small. It should be pointed out that the amount of solution applied in Example VII was less than that applied in Example VI.

In Example VII, a preliminary bake was used following both coating steps. This is not always necessary but was advisable in this instance because in general, under the same conditions of treatment, water is removed at a slower rate from the more concentrated solution of Example III than from the more dilute solution of Example II.

A tube made according to the procedure set forth in Example VII was heated for approximately 1000 hours at 1000° F. and showed a total loss in weight of about 1.25% and an increase in length of only 0.425%.

Tubes made according to Examples VI and VII above were heated for one hour at 1800° F. With tubes made by the procedure of Example VI, the weight loss was 1.12% and the increase in length 0.22%; and with tubes resulting from the procedure of Example VII, the weight loss was 2.5% and the gain in length 1.0%. Additional heating up to 5 hours, including one hour at 2000° F., and with determinations made hourly showed that the changes were substantially complete within the first hour. Excellent strength was retained in the tubes resulting from the second procedure employing the solution of Example III while the tubes made in accordance with the first procedure using the solution of Example II were definitely not as good, but the strength retained was entirely adequate for many purposes.

A weight loss especially combined with a small increase in dimensions would indicate an increase in porosity. In spite of the indication test runs from a number of water soak tests showed that as the heating time is extended the percentage of water absorbed in a given time actually decreases. This would indicate that there is an internal change during which interconnected voids before sealed off.

The tubes made in accordance with the solution and method of the present invention give off a distinctly metallic sound when struck, are easily machined, and have cutting characteristics similar to those of wood. The tubes find application as bushings for electrodes in electrical heating equipment. The various physical and the electrical characteristics of tubes will of course vary somewhat depending upon the specific method of preparation employed and upon other factors. However, the tabulation below of characteristics of one specific type and size of tube are representative. The permissible time of exposure of course is less near the upper limit of the range of heat resistance given below.

TABLE A

| | |
|---|---|
| I.D. (in.) | 1. |
| O.D. (in.) | 1⅛. |
| Wall (in.) | 1/16. |
| Heat resistance (° F.) | 1200 to 2000. |
| Specific gravity | 1.8 to 2.0. |
| Density (lbs./in.³) | 0.065 to 0.072. |
| Water absorption (percent) | 7.5. |
| Compressive strength: | |
|     Axial (p.s.i.) | 8500. |
|     Radial (lbs./in.) | 18. |
| Dielectric strength (volts/mil), perpendicular to lamination tested in oil, S.T. | 550. |
| Dielectric constant at 60 cycles/sec., 0.25 Crest kv.: | |
|     150° C | 2.9. |
|     30° C | 2.7. |
| Dissipation factor at 60 cycles/sec., 0.25 Crest kv.: | |
|     150° C | .035. |
|     100° C | .0086. |
|     60° C | .0028. |
|     30° C | .0013. |
| Arc resistance (sec.), ASTM D494–41 | Greater than 300 seconds. |

LAMINATES

In the production of flat laminates certain factors must be considered that do not apply to round tubes. The difference appears to be related to the difference in physical conditions set up between the pressure applied during rolling while the paper is in motion and the static pressure applied in the press. In making a tube, water from chemical reaction is not usually formed until the early stages of the heat treatment. In making a laminate there must be clear evidence of its formation during the pressing operation, otherwise the bond will be unsatisfactory. It will not be produced unless there is a proper combination of molding pressure and applied temperature. Where calculations show the presence of any free water, whatever bond is formed is only of a physical nature.

Because of the molding pressure required, the density of a flat laminate is usually higher than that of a tube. Therefore, it is preferable to remove more water after coating so that less will be necessary to remove in the press. On the other hand, the presence of at least some free water is necessary in order for the chemical reaction to take place to the necessary extent. There has been no conclusive proof but it is suspected that the reaction is promoted by employing a temperature of at least 325° F. and by the formation of steam within the laminate. This indication is borne out by the fact that when the molding pressure is too low even with a molding temperature of around 350° F. the amount of water of reaction formed falls off.

A molding temperature of between 325 and 350° F. and a molding pressure from between 250 and 1000 p.s.i. is preferred. The selection of the molding pressure is determined primarily by the ultimate density desired. The time may range from one hour upward, depending on the laminate thickness and area involved.

With increasing thickness or area, moisture is removed at a progressively slower rate, so rather than allowing the water present to increase in proportion, the amount removed should be regulated accordingly and preferably should not exceed 1.75 to 2.25 grams per square foot. This can be done by increasing the baking time or temperature or where end results that must be obtained permit by reducing the amount of solution applied.

There are four principal ways in which the removal of water from the press may be expedited:

(1) By the use of breather press plates;
(2) By bumping, i.e., through use of intermittent pressure;
(3) By molding at the lowest pressure possible, commensurate with the formation of water of reaction; and
(4) By the use of a second and lower pressure.

Breather plates contain a plurality of perforations connected with exit means on the back so that moisture can be removed through the face of the laminate rather than having the escape for the most part take place through the edges thereof. This method may be used where maximum surface smoothness is not of first importance.

Bumping consists of a momentary release of pressure usually with a reapplication to the original value. It should be done only within the first few minutes after molding temperature is reached. It is important to bear in mind that as the chemical reaction proceeds the bond formed is of a crystalline nature and therefore quite rigid. If disrupted by expansion or by sudden release of steam, it will not cure properly when the pressure is reapplied. Even when the bumping is done in the early stages, it is preferable to release the pressure only to the point where the exit of steam is observable rather than dropping it to zero.

As molding pressure increases, there should be a more or less corresponding increase in temperature so that in any case some moisture is able to escape. High pressures will increase the density simply by compression, but the laminate thickness will be further decreased if moisture is removed while the binder is still in a more or less thermoplastic condition. On the other hand, the higher the pressure the greater will be the stresses set up within the laminate. It has been found that in general the best way to bring about sufficient removal of moisture is to first press for a time at the desired pressure and long enough to produce a good chemical bond and then reduce the pressure to a point more favorable to moisture removal and thereafter to continue molding for a time at the lower pressure. If the beginning pressure is low enough the secondary pressure may not be needed, especially with a low thickness and where the area is not too great. However, the following tabulation is suggested as a guide:

| Primary Pressure | Secondary Pressure |
| --- | --- |
| 1000 p.s.i. | 160 p.s.i. |
| 500 do. | 80 do. |
| 250 do. | 40 do. |

Note that, as the primary pressure is decreased, the secondary pressure is also decreased. This is preferable because with decreased compression there is less risk of disrupting the bond on release of pressure since the amount of internal stress is less.

The following is an outline of the procedure followed in making a hot pressed flat laminate employing 0.002 inch thick paper and the solution of Example III. The specific data are based on a 14-ply laminate having an area of approximately 50 square inches.

*Example III*

A. COATING

| | Grams |
| --- | --- |
| Weight of paper | 40.25 |
| 1st coat, 10.2% | 4.10 |
| Bake, 10 min. at 250° F. | |
| 2nd coat, 9.2% | 3.71 |
| Bake, 10 min. at 250° F. | |
| Total amount of solution used, 19.4% | 7.81 |
| Total amount $H_2O$ applied | 2.34 |
| Total $H_2O$ lost, 83.5% | 1.95 |
| $H_2O$ in paper remaining from that applied | 0.39 |

B. PRESSING

| | |
| --- | --- |
| Temperature | 340 to 350° F. |
| Pressure and time | 1 hr. at 490 to 500 p.s.i. / 1 hr. at 80 to 85 p.s.i. |
| $H_2O$ lost in press | 0.80 gram. |

C. AFTERBAKE

| | | |
| --- | --- | --- |
| Temperature | ° F | 200 |
| Time | hrs | 8 to 16 |
| $H_2O$ lost | gram | .04 |

D. HEAT TREAT

| | | |
| --- | --- | --- |
| Temperature | ° F | 1000 |
| Time | hr | 1 |
| $H_2O$ lost | gram | .50 |

E. THICKNESS

| | | |
| --- | --- | --- |
| Laminate | in | .0224 |
| Individual sheet | in | .0016 |
| Specific gravity | | 2.23 |
| Lbs./cu. in. | | .080 |

It should be noted that the amount of water lost while hot pressing was approximately twice that which remained after the paper was coated and preliminarily baked. The difference represents the water formed by reaction between the mica particles and the solution applied.

A small amount of moisture formed by reaction was left in the laminate after the pressing operation. This was the amount lost during the afterbake step and, although it amounted to only 0.04 gram, if this were suddenly converted to steam, it could easily rupture the laminate. Therefore, it is advisable to get rid of any residue by baking at a low temperature before proceeding with the heat treatment which brings about the final cure and during which all remaining acidity in the binder in reacted. The final reaction also produces some water but it is formed at a fairly slow rate and its escape in small but continuous quantities does no harm.

The final reaction progresses but slowly at lower temperatures and temperatures in the range from about 800 to 1000° F. are preferred. If time consumed is not important, the final heat treating temperature may be dropped to as low as 500° F., in which case a period of 30 to 40 hours may be required to render the laminate sufficiently stable in the presence of moisture.

The solution of Example II may be employed in the procedure set forth in Example VIII above and of course the amount of solution applied may vary in any case. The changes which take place with regard to water as set forth in detail in Example VII above are illustrative merely and can serve as a general guide for any given application.

The general statement previously made to the effect that some order of reaction should become evident during pressing in order that a satisfactory product be obtained needs some clarification as there are certain exceptions which should be noted. A small amount of the original water has been found occasionally in instances where a satisfactory laminate was built up from only a very few sheets. Of course, where a single sheet is pressed, formation of a bond is not a factor. The same condition has also been observed when working with unusually thin paper, for example, paper having a thickness of 0.0015 inch, and with paper having unusually fine mica particles. In these cases the molding pressure was only 200 pounds per square inch at 325° F. As already pointed out, such a combination of conditions to start with is not favorable to promoting the reaction. Nevertheless, good end results have been observed and by that is meant that good strength in the product and no difficulty encountered during the subsequent heat treatment. The good quality of the bond which was obtained may be accounted for by the exceptionally fine particles of mica in the paper.

The following example is illustrative of a modified procedure which may be successfully employed in the practice of the invention and wherein a reduced amount of solution and only a single bake need be used.

*Example IX*

The solution of Example III was used in a total amount of 21% on 0.003 inch thick paper composed of unusually fine particles. Each side was coated in succession and then the coated paper was given a single bake for 8 minutes at 250° F. The solution used amounted to only about two-thirds of that usually employed for such paper.

The single bake removed 93% of the water applied so that in a 48-ply laminate having approximately 50 square inches of area, the water going into the press was 1.08 grams. After molding for one hour at 250 p.s.i., one hour at 80 p.s.i., and one hour at 40 p.s.i., and with a temperature of about 350° F., the loss was found to be several times as much as the water put into the press. Further processing of the laminate through the afterbake and heat treat steps produced a good sound product. The specific gravity after final heat treating was 2.18. Example IX serves also to point up the advantage of a prolonged press time especially associated with low pressures.

The preparation of a laminate by cutting and piling a number of sheets requires considerable time. An alternative method, which is much simpler and which can be used where the laminate area is not too large, consists of rolling the paper on a mandrel the same as in making a tube and using a mandrel of the proper size with the right number of layers of paper and then either slitting the roll and flattening it before pressing, or removing the tube and flattening it, in which case the area will be cut in half but the thickness doubled.

Where large presses are not available, laminating may be accomplished by passing the coated and partially dried sheets one or more times between pressure rolls while the sheets are still warm. This method makes it possible to produce laminates of practically any desired length and width, but the resultant density will be lower than by conventional hot pressing and of the order of that obtained in tubes or perhaps lower.

Aluminum foil forms a very strong physical bond with treated mica paper when pressed against it. The combination shows promise in the manufacture of various types of capacitors.

When the edge of a laminate is forced open with a sharp tool before heat treating, it will be found that the break will occur between the sheets of paper. After the heat treatment the same test will show this location, i.e., between the sheets, to be the strongest and the point of failure will be within a single paper thickness. This should not be taken to indicate that the paper has weakened, but rather that the bond has increased in strength due to the completion of the reaction.

The change which occurs upon heat treating is very evident from examination of a single pressed sheet before and after heat treating. There will be noted a decided change from a condition of translucency toward opacity. Heat treating at 1000° F. does not appreciably change the slate gray color observed after molding with any of the solutions of the invention, nor is there much difference in appearance up to 1600° F. However, between 1600 and 1800° F., there is a pronounced color change during which both laminates and tubes assume a definite yellowish cast. There is no definitely known reason for this, but it may be caused by a gradual reaction between the binder and the mica. At any rate, heating at 1800° F. causes a decided increase in hardness. It is also characteristic of a pressed laminate to increase somewhat in hardness on being heat treated, as shown by superficial Rockwell tests, but the change is small, being more pronounced in areas where a small shrinkage occurs, hence a higher density produced.

What is claimed is:

1. An aqueous acidic aluminum phosphate solution consisting essentially of water and between about 3% and about 4½% by weight of aluminum when the $PO_4$ concentration is about 64%.

2. Particulate mica in sheet form having at least a portion of the pores of said sheet impregnated with an aqueous acidic solution consisting essentially of ingredients in relative quantities of about 730 parts by weight of $PO_4$, between about 34 and about 80 parts by weight of aluminum, up to about 34 parts by weight of magnesium, between about 300 and about 1,550 parts by weight of water, and up to 770 parts by weight of powdered mica, said particulate mica having been in sheet form prior to the impregnation with said solution.

3. Particulate mica in sheet form having the particles thereof bonded by the heat reaction product of said particles and a solution consisting essentially of ingredients in relative quantities of about 730 parts by weight of $PO_4$, between about 34 and about 80 parts by weight of aluminum, and up to about 34 parts by weight of magnesium, between about 300 and about 1,550 parts by weight of water, and up to 770 parts by weight of powdered mica, said particulate mica having been in sheet form prior to the impregnation with said solution.

4. A fabricated article comprising a plurality of layers of particulate mica, each of which has at least a portion of the pores impregnated with an aqueous acidic solution consisting essentially of ingredients in relative quantities of about 730 parts by weight of $PO_4$, between about 34 and about 80 parts by weight of aluminum, up to about 34 parts by weight of magnesium, between about 300 and about 1,550 parts by weight of water, and up to 770 parts by weight of powdered mica, the pH of said solution being numerically at least about 1.4, said layers having been in sheet form prior to impregnation with said solution.

5. A wound tubular article made up from a plurality of layers of particulate mica in sheet form each sheet of which has a portion at least of the pores thereof impregnated with an aqueous acidic solution consisting essentially of ingredients in relative quantities of about 730 parts by weight of $PO_4$, between about 34 and about 80 parts by weight of aluminum, up to about 34 parts by weight of magnesium, between about 300 and about 1,550 parts by weight of water, and up to 770 parts by weight of powdered mica, said particulate mica having been in sheet form prior to impregnation with said solution.

6. A method of treating particulate mica in sheet form comprising the steps of impregnating particulate mica in sheet form with an aqueous solution consisting essentially of ingredients in relative quantities of about 730 parts by weight of $PO_4$, between about 34 and about 80 parts by weight of aluminum, up to about 34 parts by weight of magnesium, between about 300 and about 1,550 parts by weight of water, up to 770 parts by weight of powdered mica, partially drying said impregnated sheet and thereafter heating said impregnated sheet to effect a reaction between said particles and said solution until substantially all of the acidic ingredients of the latter have reacted.

7. A method of treating particulate mica in binder-free sheet form which comprises the steps of applying to one surface of a sheet of mica a coating of a binder consisting essentially of ingredients in relative quantities of about 730 parts by weight of $PO_4$, between about 34 and about 80 parts by weight of aluminum and between about 300 and about 1,550 parts by weight of water, said binder being applied in insufficient quantity to completely saturate said paper, and thereafter drying said binder on said surface at a temperature less than about 300° F.

8. An acidic composition for the saturating, coating, and bonding of mica paper containing ingredients in relative quantities by weight of about 730 parts of $PO_4$, about 34 to about 80 parts of aluminum, up to about 34 parts of magnesium, about 300 to 1,550 parts of water and up to about 770 parts of finely powdered mica.

9. An acidic composition for the saturating, coating, and bonding of mica paper containing ingredients in relative quantities of about 730 parts of $PO_4$, about 34 to 80 parts of aluminum, between about 15 and about 34 parts of magnesium, between about 300 and about 1,550 parts of water and up to about 770 parts of finely powdered mica.

10. A method of treating particulate mica in binder-free sheet form which comprises the steps of applying to one surface of said sheet a coating of a binder consisting essentially of ingredients in relative quantities of about 730 parts by weight of $PO_4$, between about 34 and about 80 parts by weight of aluminum and between about 300 and about 1,550 parts by weight of water, said binder being applied in insufficient quantity to completely saturate said paper, drying said binder on said surface at a temperature less than about 300° F., applying to the other side of said sheet an amount of said binder sufficient to completely saturate said paper and thereafter slowly increasing the temperature to effect drying and thereafter to effect a reaction between said binder and said mica particles until substantially all of the acidic ingredients of said binder have reacted.

11. Particulate mica in sheet form having a portion of its voids impregnated only with an impregnant consisting essentially of ingredients in relative quantities of about 730 parts by weight of $PO_4$, between about 34 and 80 parts by weight of aluminum and between about 300 and about 1,550 parts by weight of water.

References Cited in the file of this patent

UNITED STATES PATENTS

| 2,455,758 | Greger | Dec. 7, 1948 |
| 2,614,055 | Senarclens | Oct. 14, 1952 |
| 2,704,261 | Comeforo | Mar. 15, 1955 |
| 2,760,879 | McDaniel et al. | Aug. 28, 1956 |
| 2,772,696 | Schneider et al. | Dec. 4, 1956 |
| 2,865,426 | Heyman | Dec. 23, 1958 |